United States Patent
Fuqua (10) Patent No.: US 10,001,057 B2
(45) Date of Patent: Jun. 19, 2018

(54) EXHAUST LAYOUT WITH ACCOMPANYING FIRING SEQUENCE FOR TWO-STROKE CYCLE, INLINE, OPPOSED-PISTON ENGINES

(71) Applicant: Achates Power, Inc., San Diego, CA (US)

(72) Inventor: Kevin B. Fuqua, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 499 days.

(21) Appl. No.: 14/450,808

(22) Filed: Aug. 4, 2014

(65) Prior Publication Data
US 2016/0032824 A1    Feb. 4, 2016

(51) Int. Cl.
F02B 75/28    (2006.01)
F01B 7/14    (2006.01)
(Continued)

(52) U.S. Cl.
CPC .............. *F02B 75/282* (2013.01); *F01B 7/14* (2013.01); *F01N 13/107* (2013.01); *F02B 25/08* (2013.01);
(Continued)

(58) Field of Classification Search
CPC ...... F01N 13/107; F01N 13/105; F01N 13/10; F02B 25/08; F02B 37/025; F02B 75/28; F02B 75/282; F02B 75/287; F02B 37/001; F02B 37/002; F02B 37/007; Y02T 10/144; F01B 7/14
(Continued)

(56) References Cited

U.S. PATENT DOCUMENTS 2,129,172 A * 9/1938 Gehrandt ................ F02B 75/28
123/51 B
2,233,499 A * 3/1941 Todd ........................ F01B 7/14
123/195 A
(Continued)

FOREIGN PATENT DOCUMENTS

FR    2972023 A1    2/2011
GB    580704 A  *  9/1946  .............. F02B 33/00
(Continued)

OTHER PUBLICATIONS

International Search Report and Written Opinion for PCT application No. PCT/US2015/043126, dated Nov. 13, 2015.

*Primary Examiner* — Thai Ba Trieu
*Assistant Examiner* — Jessica Kebea
(74) *Attorney, Agent, or Firm* — Terrance A. Meador (57) ABSTRACT

An opposed-piston engine includes an inline cylinder block with an open exhaust chamber that contains all of the engine's exhaust ports. Exhaust outlets open from the exhaust chamber through opposing sides of the cylinder block. A turbocharger is positioned on each side of the cylinder block and has an inlet closely coupled with a respective exhaust outlet. The exhaust chamber is divided into separate collector sections, each collector section containing the exhaust ports of one or more cylinders, and each turbocharger has a first inlet closely coupled with a first collector section and a second inlet closely coupled with a second collector section. The engine has a cylinder firing sequence which alternates between the cylinders in the first and second collector sections.

9 Claims, 5 Drawing Sheets

(51) Int. Cl.
    *F01N 13/10*     (2010.01)
    *F02B 25/08*     (2006.01)
    *F02B 37/00*     (2006.01)
    *F02B 37/02*     (2006.01)

(52) U.S. Cl.
    CPC .......... *F02B 37/001* (2013.01); *F02B 37/025* (2013.01); *Y02T 10/144* (2013.01)

(58) Field of Classification Search
    USPC .......................................................... 60/612
    See application file for complete search history.

(56) References Cited

U.S. PATENT DOCUMENTS

| | | | | |
|---|---|---|---|---|
| 2,248,423 | A * | 7/1941 | Buchi | F02B 67/10 60/612 |
| 2,548,609 | A * | 4/1951 | Johansson | F02B 33/00 417/203 |
| 2,611,349 | A * | 9/1952 | Parrish | F01B 7/14 123/190.2 |
| 3,469,393 | A | 9/1969 | Tryhorn | |
| 4,117,675 | A | 10/1978 | Tanaka et al. | |
| 4,905,637 | A * | 3/1990 | Ott | F01B 3/0026 123/196 R |
| 5,012,648 | A | 5/1991 | Okumura et al. | |
| 5,822,986 | A | 10/1998 | Higashide | |
| 5,857,336 | A * | 1/1999 | Paul | F02B 37/00 60/597 |
| 6,182,619 | B1 * | 2/2001 | Spitzer | F02B 25/08 123/51 B |
| 8,443,602 | B2 | 5/2013 | Bennet et al. | |
| 8,677,749 | B2 | 3/2014 | Laimboeck et al. | |
| 8,789,499 | B2 * | 7/2014 | Alonso | F01B 3/10 123/197.4 |
| 9,399,969 | B2 * | 7/2016 | Boyer | F02M 26/04 |
| 9,435,290 | B2 * | 9/2016 | Fuqua | F02F 7/0009 |
| 2011/0139104 | A1 | 6/2011 | Christian et al. | |
| 2011/0253113 | A1 | 10/2011 | Roth et al. | |
| 2012/0192559 | A1 * | 8/2012 | Laimboeck | F02B 37/001 60/605.1 |
| 2014/0356153 | A1 * | 12/2014 | Hoshi | F01D 9/026 415/205 |
| 2015/0337727 | A1 * | 11/2015 | Fuqua | F01B 7/14 60/597 |
| 2015/0337728 | A1 * | 11/2015 | Fuqua | F01B 7/14 60/597 |
| 2016/0032823 | A1 * | 2/2016 | McClearen | F02B 75/28 123/51 B |
| 2016/0252044 | A1 * | 9/2016 | McClearen | F02F 1/004 |

FOREIGN PATENT DOCUMENTS

| | | | | |
|---|---|---|---|---|
| GB | | 736581 A * | 9/1955 | .............. F02B 33/44 |
| JP | WO 2013099461 A1 * | | 7/2013 | .............. F01D 9/026 |

\* cited by examiner

EXHAUST LAYOUT WITH ACCOMPANYING FIRING SEQUENCE FOR TWO-STROKE CYCLE, INLINE, OPPOSED-PISTON ENGINES

RELATED APPLICATIONS

This application contains subject matter related to commonly-owned U.S. application Ser. No. 14/284,058 filed May 21, 2014 for "Air Handling Construction For Opposed-Piston Engines" and commonly-owned U.S. application Ser. No. 14/284,134 filed May 21, 2014 for "Open Intake and Exhaust Chamber Construction for Air Handling System of an Opposed-Piston Engine".

BACKGROUND

The field is a two-stroke internal combustion opposed-piston engine. Particularly, the field concerns an air handling system with provision for transporting exhaust from the cylinders of an opposed-piston engine.

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed in the bore of a cylinder for reciprocating movement in opposing directions along the central axis of the cylinder. Each piston moves between a bottom center (BC) location where it is nearest one end of the cylinder and a top center (TC) location where it is furthest from the one end. The cylinder has ports formed in the cylinder sidewall near respective BC piston locations. Each of the opposed pistons controls one of the ports, opening the port as it moves to its BC location, and closing the port as it moves from BC toward its TC location. One of the ports serves to admit charge air into the bore, the other provides passage for the products of combustion out of the bore; these are respectively termed "intake" and "exhaust" ports (in some descriptions, intake ports are referred to as "air" ports or "scavenge" ports). In a uniflow-scavenged opposed-piston engine, pressurized charge air enters a cylinder through its intake port as exhaust gas flows out of its exhaust port, thus gas flows through the cylinder in a single direction ("uniflow")—from intake port to exhaust port.

Figure 1:
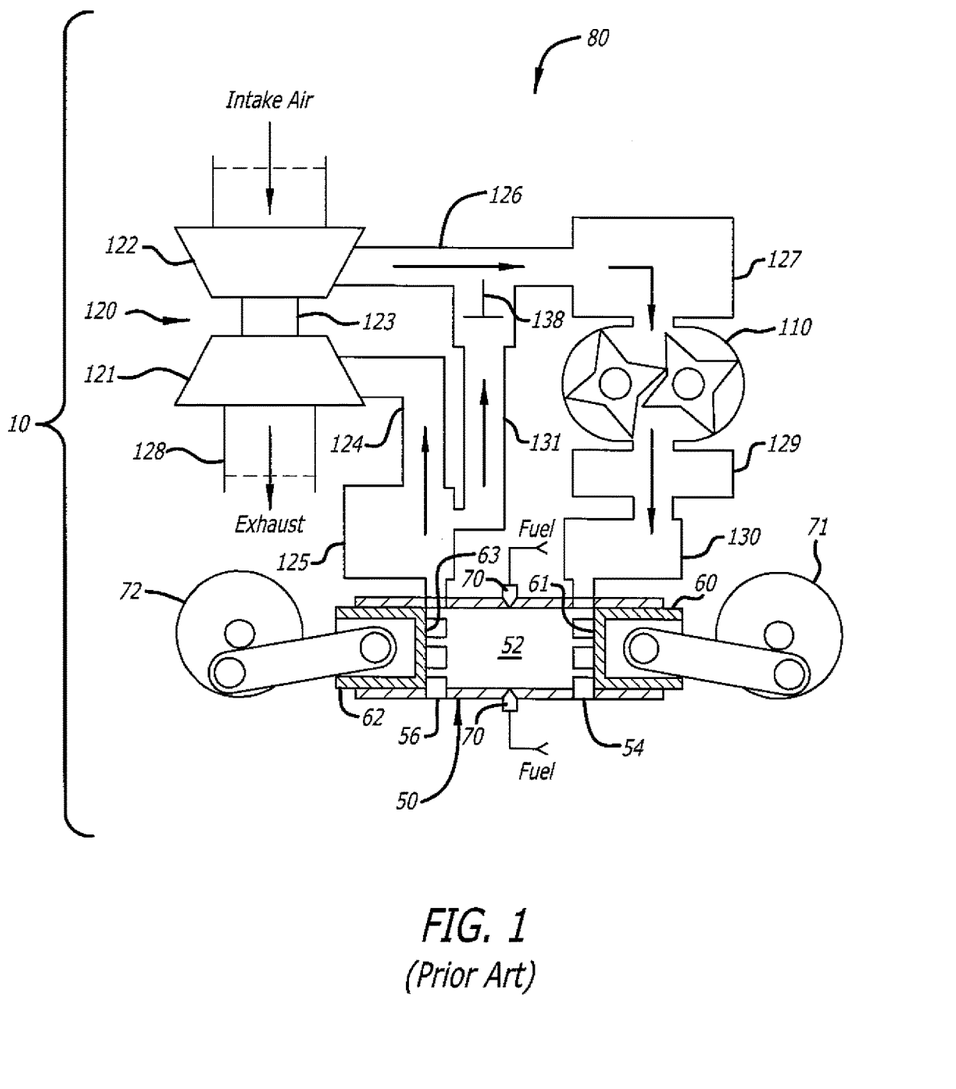
FIG. 1 is a diagram of an opposed-piston engine equipped with an air handling system and is properly labeled "Prior Art".

In FIG. 1, an opposed-piston engine 10 having at least one ported cylinder 50 embodies a two-stroke-cycle internal combustion engine. Each ported cylinder 50 has a bore 52 and longitudinally spaced intake and exhaust ports 54 and 56 formed or machined in respective ends of a cylinder wall. Each of the intake and exhaust ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. In the example shown, the engine 10 further includes two spaced-apart crankshafts 71 and 72 disposed in a parallel array. Intake and exhaust pistons 60 and 62 are slideably disposed in the bore 52 with their end surfaces 61 and 63 opposing one another. The intake pistons 60 are coupled to the crankshaft 71, and the exhaust pistons are coupled to the crankshaft 72.

As the pistons 60 and 62 in a cylinder 50 near TC, a combustion chamber is defined in the bore 52 between the end surfaces 61 and 63 of the pistons. Combustion timing is frequently referenced to the point in a compression cycle where minimum combustion chamber volume occurs; this point is referred to as "minimum volume." Fuel is injected directly into cylinder space located between the end surfaces 61 and 63. In some instances injection occurs at or near minimum volume; in other instances, injection may occur before minimum volume. Fuel is injected through fuel injector nozzles 70 positioned in respective openings through the sidewall of the cylinder 50. Preferably, the fuel injector nozzles 70 are positioned to inject respective sprays of fuel in opposing directions along a diameter of the bore 52. The fuel mixes with charge air admitted into the bore 52 through the intake port 54. As the air-fuel mixture is compressed between the end surfaces 61 and 63, the compressed air reaches a temperature that causes the fuel to ignite. Combustion follows.

In multi-cylinder opposed-piston engines with two crankshafts, the crankshafts are configured in such a manner as to cause minimum volume conditions (MV) to occur among the cylinders in a predetermined order during each complete revolution of a designated one of the crankshafts. For example, in a four-cylinder engine, with the cylinders numbered 1-4 in linear sequence, one order may have cylinder 2 achieving MV at 90°, cylinder 4 at 180°, cylinder 1 at 270°, and cylinder 3 at 360°. Fuel injection operation is timed to synchronize ignition and combustion with the MV order. Each combustion occurrence is termed a "cylinder firing", and the engine is considered to have a "cylinder firing sequence" (also referred to as a "cylinder firing order") that conforms to the MV (or injection) sequence.

As per FIG. 1, the engine 10 includes an air handling system 80 comprising a turbocharger 120 with a turbine 121 and a compressor 122 that rotate on a common shaft 123. The turbine 121 is in fluid communication with an exhaust channel 124 and the compressor 122 is in fluid communication with a charge air channel 126. Exhaust gas discharged from the exhaust ports 56 is received by an exhaust gas collector 125 and flows from there into the exhaust channel 124. The turbine 121 is rotated by the fluid pressure of the exhaust gas passing through it. This rotates the compressor 122, causing it to generate charge air by compressing fresh air. The charge air produced by the compressor 122 flows through the charge air channel 126 to a cooler 127 from where it is pumped by a supercharger 110 to the intake ports. Charge air compressed by the supercharger 110 can be output through a cooler 129 to an intake distributor 130. The intake ports 54 receive pressurized charge air via the intake distributor 130.

Many applications require integration of a two-stroke cycle, opposed-piston engine into engine space designed for traditional four-stroke engines, and it is critical to minimize the size of the engine without sacrificing engine efficiency and performance characteristics. Location, layout, and integration of charge air and exhaust subsystems pose significant challenges when designing compact opposed-piston engine constructions for fitment into traditional motor spaces. For example, see commonly-owned U.S. patent application Ser. No. 13/891,466, titled "Placement of an Opposed-Piston Engine in a Heavy-Duty Truck".

Related application Ser. Nos. 14/284,058 and 14/284,134 describe how some of these compactness challenges are met in an opposed-piston engine construction with multiple cylinders arranged inline in a cylinder block. A single exhaust chamber inside the cylinder block contains all of the cylinder exhaust ports, thereby eliminating the need for a flanged, multi-pipe manifold construction. Instead of collecting and transporting exhaust gas discharged from individual exhaust ports with dedicated sets of pipes, exhaust gas discharged by all of the exhaust ports is collected in the single exhaust chamber. The discharged exhaust gas exits the chamber through at least one exhaust outlet that opens through the cylinder block. Advantageously, only a single pipe is required to transport exhaust gas from the exhaust outlet, thereby eliminating flange-to-flange spacing between separate pipes of conventional exhaust manifolds. As a result, the weight of multi-pipe manifolds is eliminated, inter-cylinder spacing can be reduced, and the engine can be made more compact.

The combination of open exhaust chamber construction with the elimination of multi-pipe exhaust manifolds reduces spikes, surges, oscillations, and other asymmetries in the flow of exhaust from the exhaust ports to the turbocharger. The smooth exhaust flow contributes to consistent, reliable combustion and scavenging. However, the in-line construction of the opposed-piston engine can impose significant constraints on engine packaging space that prevent close, smooth coupling between the exhaust chamber and the turbocharger, which can limit the benefits achievable with the open exhaust chamber construction. For example, exhaust outlets that open through opposing sides of an inline cylinder block can provide straight, short, smooth transport paths from the open exhaust chamber. But without packaging space for straight, short channels along the sides of the cylinder block, the transport paths to the turbocharger can become eccentric, thereby introducing turbulence into the exhaust flow.

Thus, there is a need for further improvement in turbocharged, uniflow-scavenged, opposed-piston engines in order to further contribute to consistent, reliable combustion and smooth gas flow with exhaust constructions that preserve or advance the goal of compactness.

SUMMARY

An opposed-piston engine includes an inline cylinder block with an open exhaust chamber that contains all of the engine's exhaust ports. Exhaust outlets open from the exhaust chamber through opposing sides of the cylinder block. A turbocharger is positioned on each side of the cylinder block and has an inlet closely coupled with a respective exhaust outlet.

In some aspects, the exhaust chamber is divided into separate collector sections. Each collector section contains the exhaust ports of one or more cylinders, and each turbocharger has a first inlet closely coupled with a first collector section and a second inlet closely coupled with a second collector section.

In some additional aspects, the engine has a firing sequence in which the firing of a first cylinder is followed by the firing of a second cylinder having an exhaust port in a collector section that does not contain the exhaust port of the first cylinder.

DETAILED DESCRIPTION OF THE PREFERRED EMBODIMENTS

Figure 2:
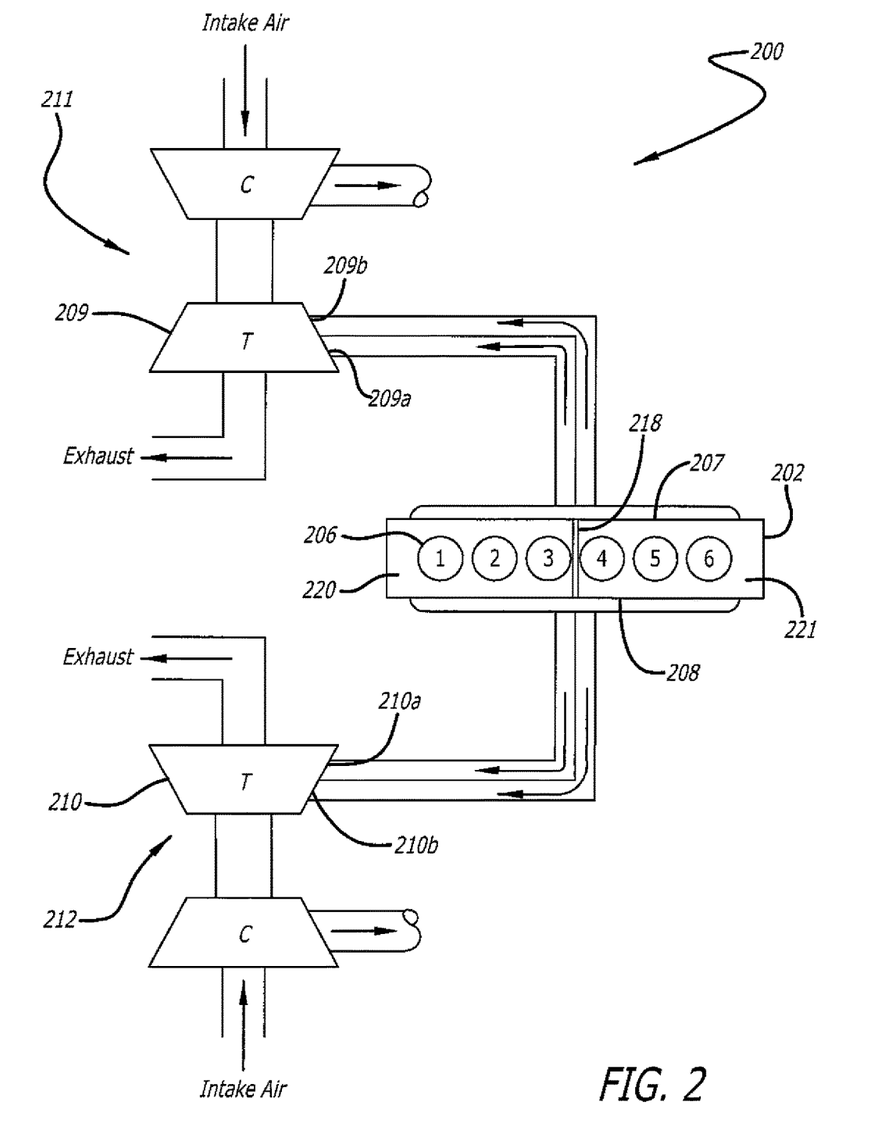
FIG. 2 is a schematic diagram showing features of an air handling system for an opposed-piston engine according to this specification.

With reference to FIG. 2, an air handling system 200 for a two-stroke cycle, opposed-piston engine includes an open exhaust chamber 202 in which the exhaust ports of the engine's cylinders 206 are located. The exhaust ports discharge exhaust gas into the exhaust chamber 202 during engine operation. The discharged exhaust gasses flow from the exhaust chamber 202 through opposing exhaust outlets 207 and 208. The exhaust gas is transported to respective turbines 209 and 210 that are in fluid communication with the exhaust chamber. Preferably, each of the turbines 209 and 210 is coupled conventionally to a respective compressor in a turbocharger assembly. The fluid flow pressure of the exhaust gas causes the turbochargers 211 and 212 to generate charge air.

As per FIG. 2, the exhaust chamber 202 is divided by a wall 218 into at least two separate collector sections 220 and 221. Each collector section contains the exhaust port of at least one cylinder 206. In the example shown, the engine has six cylinders 206, and each of the collector sections 220 and 221 contains the exhaust ports of three cylinders. Each of the turbines 209 and 210 is a dual inlet device, and each inlet of a turbine is in fluid communication with a respective one of the collector sections 220 and 221 through a respective one of the opposing exhaust outlets 207 and 208. Thus, inlets 209a and 209b of the turbine 209 are in fluid communication with the collector sections 220 and 221, respectively, via the exhaust outlet 207. Similarly, inlets 210a and 210b of the turbine 210 are in fluid communication with the collector sections 220 and 221 via exhaust outlet 208. Remaining and additional components of the air handling system are intentionally omitted from this specification with the understanding that exhaust and charge air channels could include various after-treatment devices, valves, one or more superchargers, and coolers for controlled transport of exhaust and delivery of charge air. Optionally, an EGR subsystem could be provided.

As seen in FIG. 2, the engine includes a plurality of cylinders 206 arranged in an inline configuration. Preferably, the engine includes 2N cylinders, where (N=1, 2, 3, . . . , n), in which the exhaust ports of N first cylinders are contained in a first collector section and the exhaust ports of N second cylinders are contained in a second collector section. In the exemplary embodiment illustrated by FIG. 2 there are six cylinders, numbered 1, 2, 3, 4, 5, and 6. The exhaust ports of cylinders 1, 2, and 3 are contained in collector section 220 and the exhaust ports of cylinders 4, 5, and 6 are contained in collector section 221. The cylinder firing sequence is constrained such that exhaust is discharged into either collector section only on alternate cylinder firings. In other words any firing sequence in the exemplary embodiment of FIG. 2 has one of cylinders 1, 2, and 3 firing in collector section 220, followed next by one of cylinders 4, 5, and 6 firing in collector section 221, followed next by another one of cylinders 1, 2, and 3 firing in collector section 220, and so on. For example, a firing sequence would comprehend equally-spaced firing events in the order: 1, 4, 2, 5, 3, 6;

another example would be 2, 5, 1, 6, 4, 3. Manifestly, a firing sequence can begin in either collector section; for example: 4, 1, 5, 2, 6, 3.

It should be evident that division of the exhaust chamber 202 into separate collector sections allows longer intervals between successive cylinder firings within each collector section. Further, the provision of opposing exhaust outlets reduces reflections generated in the collector sections. Taken together, these features reduce turbulence in the discharged exhaust gas and enable the use of dual, twin-scroll turbochargers. All of these benefits are realized in a compact opposed-piston engine.

Refer now to FIGS. 3, 4A, 4B, and 5 for an understanding of a representative opposed-piston engine construction incorporating an air handling system according to FIG. 2. The opposed-piston engine is shown with a number of components removed to more clearly illustrate a preferred air handling construction including close coupling of the turbines 209 and 210 with the open exhaust chamber 202. The engine includes a cylinder block 300. Although the figures show the cylinder block 300 in an upright, vertical position, this is for illustration only; in fact the cylinder block may be disposed in a slanted or a horizontal position. The cylinder block 300 has opposite, outward-facing sides 302 and 303. The exhaust outlets 207 and 208 comprise respective elongate slot-like openings through the opposite sides of the cylinder block 300. As is shown in these figures, the cylinder block 300 includes multiple cylinders. For illustration, six cylinders 206 are shown, although more or fewer cylinders are contemplated. In this specification, a "cylinder" is constituted of a liner (sometimes called a "sleeve") retained in a cylinder tunnel formed in the cylinder block 300. Each liner has an annular intake portion including a cylinder intake port longitudinally separated from an annular exhaust portion including a cylinder exhaust port. Two counter-moving pistons (not shown) are disposed in opposition in the bore of each liner. The cylinders 206 are arranged inline in the cylinder block 300, with the intake ports and exhaust ports aligned at separate levels of the cylinder block 300. Although the figures show the exhaust ports disposed at a level above the intake ports, this is meant only for illustration.

Figure 3:
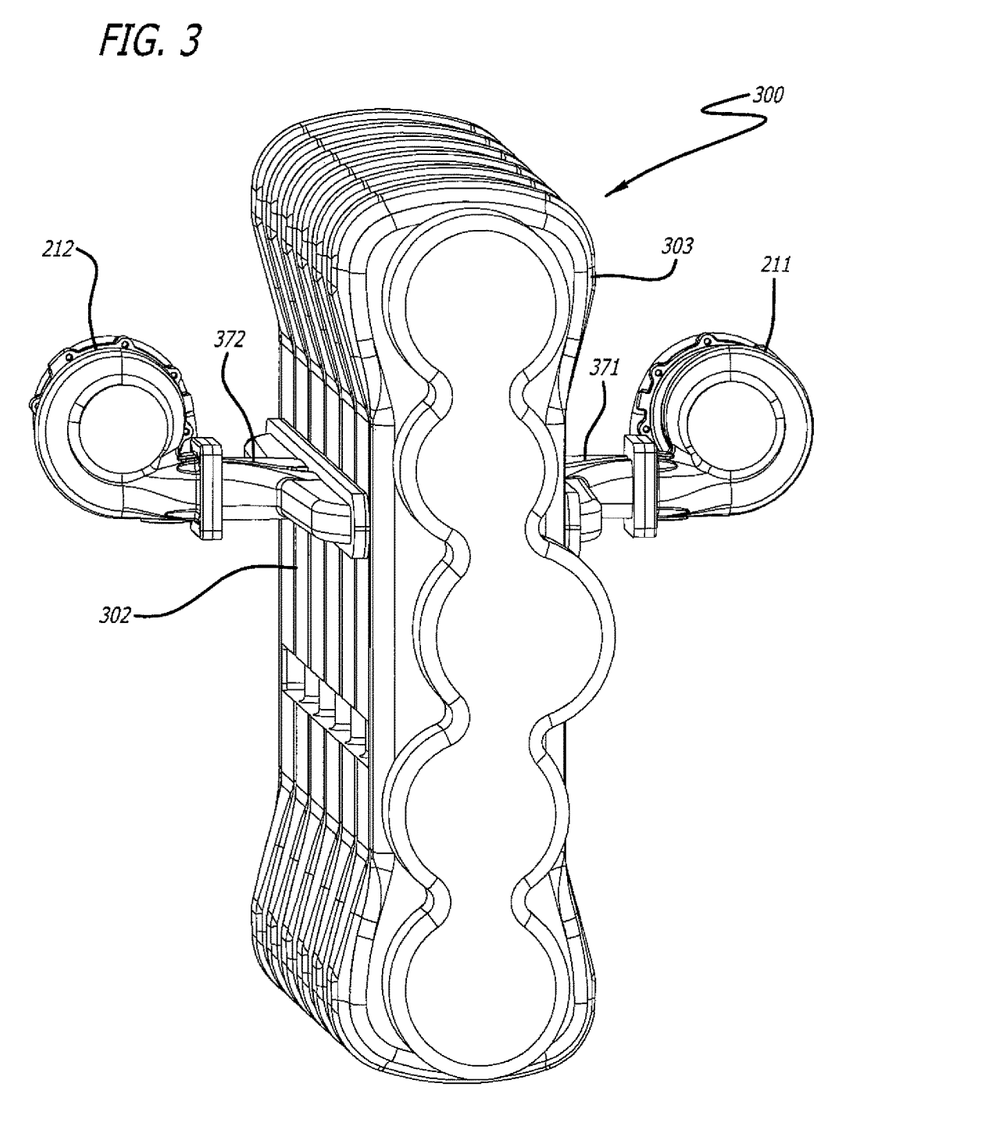
FIG. 3 is an isometric view of the engine block of an opposed-piston engine showing turbochargers on respective opposing sides thereof according to this specification.

The cylinder block 300 is shown with the pair of twin-scroll turbochargers 211 and 212 as being identical, symmetrically mirrored, and attached to the opposite sides of the cylinder block 300 via adaptors 371 and 372. Each turbocharger has a pair of inlets. Thus, the turbocharger 209 has inlets 209a and 209b, and the turbocharger 210 has inlets 210a and 210b. In this configuration, the turbochargers 211 and 212 would be counter-rotating, which is to say that one would be a right-hand rotation assembly and the other would be a left-hand rotating machine. This is a design choice as the turbochargers could be oriented to be co-rotating. Although the turbochargers 211 and 212 are shown extending horizontally outward from the cylinder block 300, this is also a design choice as they could be positioned in an upward or downward orientation or angled in either direction so as to accommodate various vehicle engine compartment profiles.

Figure 4A:
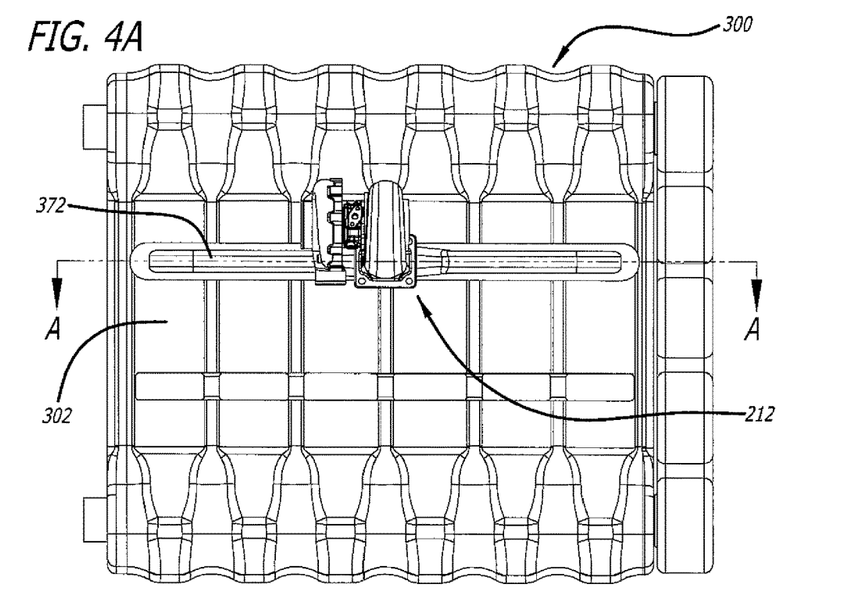
FIG. 4A is a side view of the engine block of FIG. 3 with one turbocharger coupled to an exhaust chamber outlet on the side.
Figure 4B:
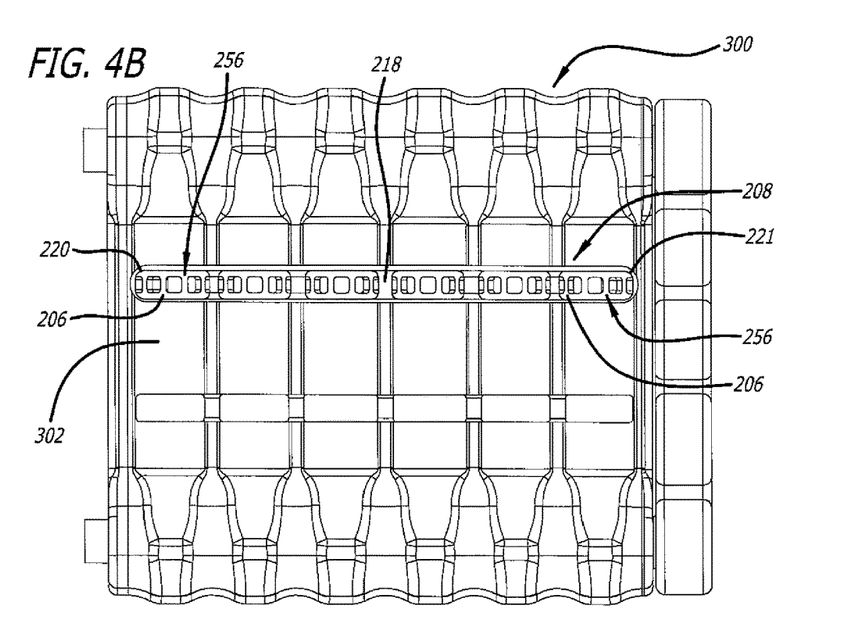
FIG. 4B is the side view of FIG. 4A, with parts removed to show the exhaust chamber outlet.

Each turbocharger is in fluid communication with the collecting sections of the exhaust chamber by way of a respective exhaust outlet in a respective side of the cylinder block. This is illustrated in FIGS. 4A and 4B with respect to the turbocharger 212 and side 302 with the understanding that the description applies as well to the turbocharger 211 and side 303. The turbocharger 212 is situated so as to receive exhaust gas discharged into the collector sections 220 and 221 of the exhaust chamber 202 from the exhaust ports 256 of the cylinders 206. For this purpose, the adaptor 372 fits to the side 302 of the cylinder block, over the exhaust outlet 208.

Figure 5:
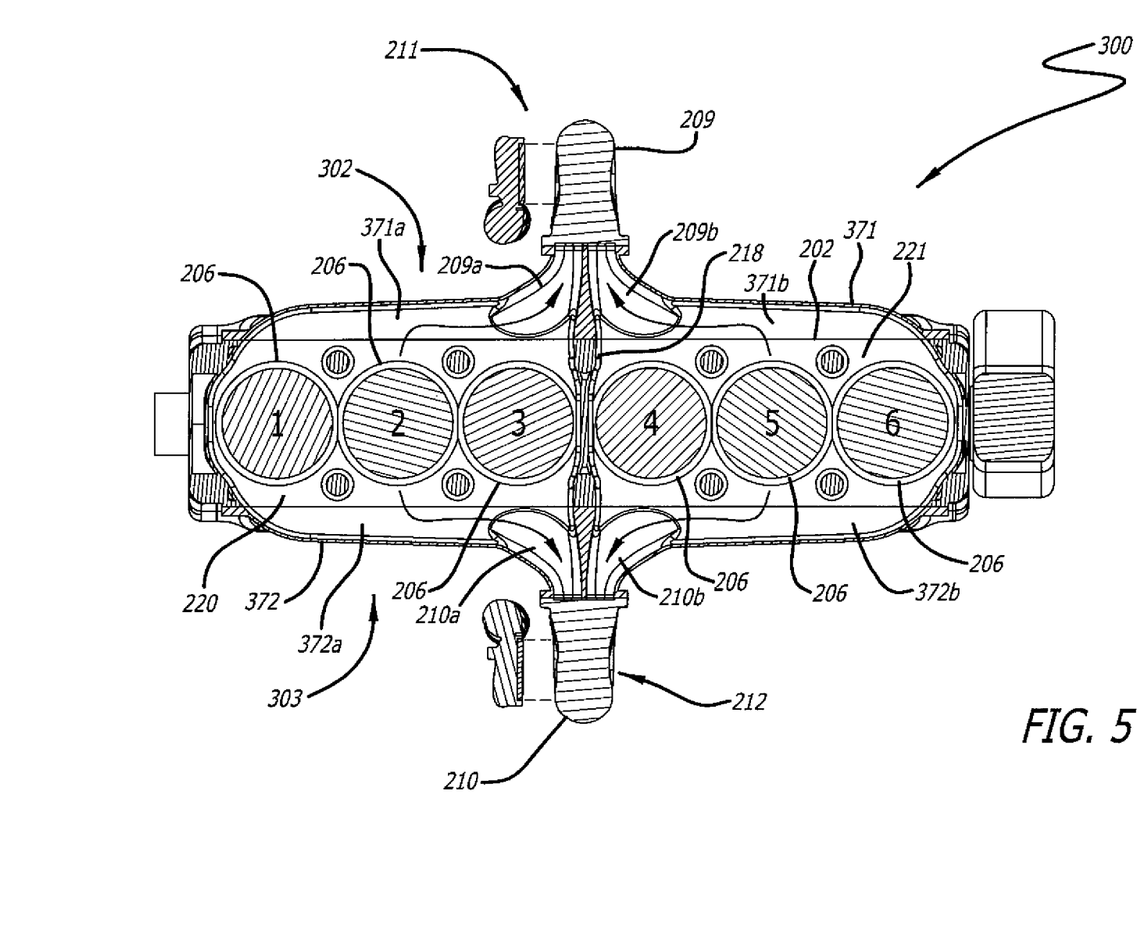
FIG. 5 is a cut-away view of the engine block of FIG. 3 taken along lines A-A of FIG. 4.

FIG. 5 shows the exhaust chamber 202 formed in the cylinder block 300 with the exhaust outlets 207 and 208 opening through the opposite sides 302 and 303. Continuing with the example shown in FIG. 2, the cylinder block 300 supports six cylinders 206, numbered, in order, as 1, 2, 3, 4, 5, and 6. The cylinders 206 are positioned in the cylinder block so as to place their exhaust ports in the exhaust chamber 202. The exhaust chamber 202 is contained in the cylinder block 300 and is divided by the wall 218 into separate collector sections 220 and 221.

Each collector section 220 and 221 is in closely-coupled fluid communication with both of the turbochargers 211 and 212 by way of the adaptors 371 and 372. Each adaptor is divided into separate sections, and each adaptor section is arranged to transport exhaust gas from a respective collector section to a respective turbocharger inlet. Thus, the adaptor 371 has separate sections 371a and 371b, and the adaptor 372 has separate sections 372a and 372b. Exhaust gas is transported from the collector section 220 to the turbocharger 209 via the transport path 371a, 209a, and is transported to the turbocharger 210 via the transport path 372a, 210a. Exhaust gas is transported from the collector section 221 to the turbocharger 209 via the transport path 371b, 209b, and is transported to the turbocharger 210 via the transport path 372b, 210b.

The split collector sections and dual, twin-scroll turbochargers closely coupled to the collector sections allow for an opposed-piston engine profile that is well suited for vehicles where engine compartment space is limited. When combined with selected cylinder firing sequences this construction also provides for smooth exhaust flow out of the cylinder exhaust ports by reducing gas wave interference between cylinder firing and ensures a constant, smooth exhaust flow into the turbochargers while still preserving engine efficiency and performance characteristics inherent in two-stroke opposed-piston, combustion ignition engines.

Although various embodiments of the invention defined by the appended claims have been illustrated and described, it is to be understood that changes and modifications may be made without departing from the spirit and scope of the invention.

The invention claimed is:

1. An opposed-piston engine, comprising:
   a cylinder block with a first side and a second side, where the first side and the second side are on opposite sides of the cylinder block and
   a plurality of cylinders divided into a first cylinder group and a second cylinder group and disposed in an inline array between the first side and second side, in which each cylinder in the first cylinder group and in the second cylinder group includes an inlet port separated in an axial direction of the cylinder from an exhaust port;
   a first collector section and a second collector section being formed in the cylinder block;
   wherein
      the first collector section including at least two exhaust ports of at least two cylinders of the first cylinder group is fluidly connected to each other within the cylinder block, and
      the first collector section having a first outlet on the first side of the cylinder block and a second outlet on the second side of the cylinder block;

wherein
  the second collector section including the exhaust ports of at least two cylinders of the second cylinder group being fluidly connected to each other within the cylinder block, and
  the second collector section having a third outlet on the first side of the cylinder block and a fourth outlet on the second side of the cylinder block; and
  wherein the second collector section is separated from the first collector section by a divided wall positioned within the cylinder block; and
a first turbocharger positioned on the first side of the cylinder block and having a first inlet receiving the exhaust from the first exhaust outlet of the first collector section and a second inlet receiving the exhaust from the third outlet of the second collector section; and
a second turbocharger positioned on the second side of the cylinder block and having a third inlet receiving the exhaust from the second exhaust outlet of the first collector section and a fourth inlet receiving the exhaust from the fourth outlet of the second collector section.

2. The opposed-piston engine of claim 1, wherein the opposed-piston engine has a firing sequence in which the firing of one of the at least two cylinders of the first cylinder group having the exhaust port in the first collector section is followed by the firing of one of the at least two cylinders of the second cylinder group having the exhaust port in the second collector section.

3. The opposed-piston engine of claim 1, wherein the plurality of cylinders includes 2N cylinders (N=2, 3, . . . , n ), in which the exhaust ports of N first cylinders are contained in the first collector section and the exhaust ports of N second cylinders are contained in the second collector section, and the opposed-piston engine has a firing sequence in which the firing of one of the at least two cylinders of the first cylinder group in the first collector section is followed by the firing of one of the at least two cylinders of the second cylinder group in the second collector section.

4. The opposed-piston engine of claim 1, wherein:
  the first turbocharger is a twin-scroll device having the first inlet in fluid communication with the first collector section through the first side of the cylinder block and having the second inlet in fluid communication with the second collector section through the first side of the cylinder block; and,
  the second turbocharger is a twin-scroll device having the third inlet in fluid communication with the first collector section through the second side of the cylinder block and having the fourth inlet in fluid communication with the second collector section through the second side of the cylinder block.

5. The opposed-piston engine of claim 4, wherein the opposed-piston engine has a firing sequence in which the firing of one of the at least two cylinders of the first cylinder group having the exhaust port in the first collector section is followed by the firing of one of the at least two cylinders of the second cylinder group having the exhaust port in the second collector section.

6. The opposed-piston engine of claim 4, wherein the plurality of cylinders includes 2N cylinders (N=2, 3, . . . , n ), in which the exhaust ports of N first cylinders are contained in the first collector section and the exhaust ports of N second cylinders are contained in the second collector section, and the opposed-piston engine has a firing sequence in which the firing of one of the at least two cylinders of the first cylinder group in the first collector section is followed by the firing of one of the at least two cylinders of the second cylinder group in the second collector section.

7. A method for operating an opposed-piston engine having a cylinder block with a first side and a second side, where the first side and the second side are on opposite sides of the cylinder block and
  a plurality of cylinders divided into a first cylinder group and a second cylinder group and disposed in an inline array between the first side and the second side, in which each cylinder in the first cylinder group and the second cylinder group includes axially-separated inlet and exhaust ports, in which the opposed-piston engine includes a first collector section and a second collector section being formed in the cylinder block;
wherein
  the first collector section including at least two of the exhaust ports of at least two cylinders of the first cylinder group is fluidly connected to each other within the cylinder block,
  the first collector section having a first outlet on the first side of the cylinder block and a second outlet on the second side of the cylinder block;
wherein
  the second collector section including at least two exhaust ports of at least two cylinders of the second cylinder group is fluidly connected to each other within the cylinder block, and
  the second collector section having a third outlet on the first side of the cylinder block and a fourth outlet on the second side of the cylinder block; and
  wherein the second collector section is separated from the first collector section by a divided wall positioned within the cylinder block; and
the method comprising:
  firing one of the at least two cylinders of the first cylinder group having the exhaust port in the first collector section:
  discharging exhaust gas from the cylinder of the first cylinder group into the first collector section;
  directing a portion of the exhaust gas from the first collector section to a first inlet of a first turbocharger; and
  directing a portion of the exhaust gas from the first collector section to a first inlet of a second turbocharger; and then,
  firing one of the at least two cylinders of the second cylinder group having the exhaust port in the second collector section;
  discharging exhaust gas from the cylinder of the second cylinder group into the second collector section;
  directing a portion of the exhaust gas from the second collector section to a second inlet of the first turbocharger; and
  directing a portion of the exhaust gas from the second collector section to a second inlet of the second turbocharger.

8. The method of claim 7, in which the plurality of cylinders are fired according to a firing sequence in which the firing of one of the at least two cylinders of the first cylinder group having the exhaust port in the first collector section is followed by the firing of one of the at least two cylinders of the second cylinder group having the exhaust port in the second collector section.

9. The method of claim 7, wherein the plurality of cylinders includes 2N cylinders (N=2, 3, . . . , n), in which the exhaust ports of N first cylinders are contained in the first collector section and the exhaust ports of N second cylinders are contained in the second collector section, further including operating the opposed-piston engine according to a firing sequence in which the firing of one of the at least two cylinders of the first cylinder group in the first collector section is followed by the firing of one of the at least two cylinders of the second cylinder group in the second collector section.

\* \* \* \* \*